E. MAYNARD.
CALK FOR HORSESHOES.
No. 16,691.          Patented Feb. 24, 1857.
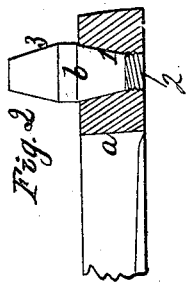
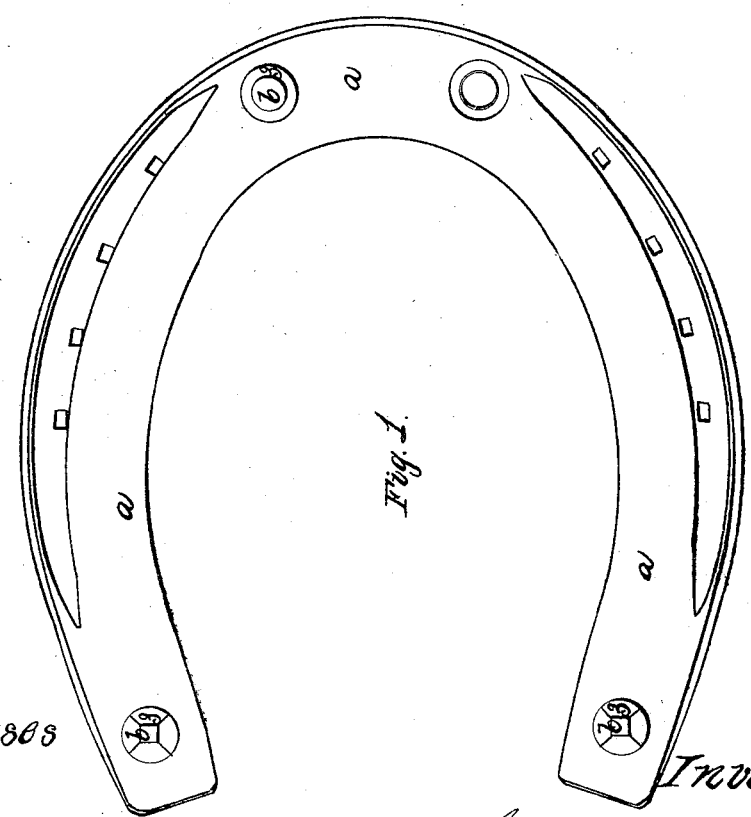
Witnesses
Lemuel W. Serrell
Wm. P. Serrell
Inventor
Edward Maynard

UNITED STATES PATENT OFFICE.

EDWARD MAYNARD, OF WILLIAMSBURG, BROOKLYN, NEW YORK.

IMPROVED CALK FOR HORSESHOES.

Specification forming part of Letters Patent No. 16,691, dated February 24, 1857.

*To all whom it may concern:*

Be it known that I, EDWARD MAYNARD, of Williamsburg, Brooklyn, in the county of Kings and State of New York, have invented, made, and applied to use a new and useful Improvement in Calks for the Shoes of Horses or other Animals; and I do hereby declare that the following is a full, clear, and exact description of the construction and operation of the same, reference being had to the annexed drawings, making part of this specification, wherein—

Figure 1 is a plan of the under side of a horseshoe with my improved calks in place; and Fig. 2 is a section of said shoe, showing also one of the calks fitted in place.

Similar marks of reference denote corresponding parts.

In fitting shoes for animals with calks it has been usual heretofore to weld a toe-plate onto the shoe and also calks at the heels. These speedily batter off or wear away, particularly in traveling over stone pavements; hence said shoes have to be taken off and fresh calks put in very often, greatly to the injury of the animal's hoof; and if said calks are not thus replenished or sharpened, the animal is apt to slip and strain or injure himself. To overcome these difficulties it has been proposed to screw the calks into the shoe, leaving a flange or plate on said calk to screw up against the face of the shoe. The calks have also been driven in from the back into dovetailed recesses; but in all these cases the calks are not only difficult to manufacture and apply to the shoe, but are costly and cannot be relied on, for the screw-calk, depending on its flange for friction to prevent unscrewing, is speedily loosened by the strain and blow on the pavement, and the dovetail-calk may be driven out by the horse in putting his foot down or striking it against a stone.

My invention overcomes all the before-mentioned difficulties; and it consists in forming the calk with a tapering or conical body with a screw on the end, which tapering or conical body enters a similarly-shaped hole in the shoe, at the upper side of which shoe the hole is formed with a screw-thread taking that on the small end of the calk. The screw thus draws the conical body down into the conical hole, wedging the same perfectly tight, and the blow on the calk when in use tends to drive it more tightly into place. The projecting part of the calk is to be round, square, chisel-shape, or any other desired form, and the calks, when worn out, or when they require to be removed, are to be unscrewed by any suitable key, wrench, or nippers.

In the drawings, *a* is the shoe, of any desired size or shape, and attached to the animal's hoof in any usual manner. *b b* are the calks, attached to said shoe in any desired positions. 1 is the tapering or conical body; 2, the screw end of the same; and 3 is the projecting part of the calk, to be formed tapering, in a square, round, or other form.

The advantages attained by this construction of calk will be apparent from the foregoing to any practical horseshoer or farrier.

I do not claim a movable screw-calk for the shoes of animals; but

What I claim, and desire to secure by Letters Patent, is—

The conical or tapering body 1 of the calk, fitting a corresponding-shaped hole in the shoe, in which it is retained by the screw 2 or its equivalent, substantially as and for the purposes specified.

In witness whereof I have hereunto set my signature this 23d day of January, 1857.

EDWARD MAYNARD.

Witnesses:
LEMUEL W. SERRELL,
WM. F. SERRELL.